United States Patent
Prior, Jr. et al.

(10) Patent No.: US 6,548,436 B2
(45) Date of Patent: Apr. 15, 2003

(54) CRISTOBALITE-FREE MULLITE GRAIN HAVING REDUCED REACTIVITY TO MOLTEN ALUMINUM AND METHOD OF PRODUCING THE SAME

(75) Inventors: H. David Prior, Jr., State College, PA (US); Daniel F. Fura, State College, PA (US)

(73) Assignee: North American Refractories Co., Moon Township, PA (US)

( * ) Notice: Subject to any disclaimer, the term of this patent is extended or adjusted under 35 U.S.C. 154(b) by 0 days.

(21) Appl. No.: 10/122,761

(22) Filed: Apr. 15, 2002

(65) Prior Publication Data

US 2002/0158373 A1 Oct. 31, 2002

Related U.S. Application Data

(62) Division of application No. 09/429,205, filed on Oct. 28, 1999, now Pat. No. 6,407,023.

(51) Int. Cl.[7] .................... C04B 35/10; C04B 35/185
(52) U.S. Cl. .................. 501/125; 501/128; 501/133; 501/153; 501/154
(58) Field of Search ................... 501/125, 128, 501/133, 153, 154

(56) References Cited

U.S. PATENT DOCUMENTS

| | | | |
|---|---|---|---|
| 2,919,995 A | 1/1960 | Landron, Jr. | ................. 501/125 |
| 3,431,126 A | 3/1969 | Fukui | ......................... 106/46 |

(List continued on next page.)

FOREIGN PATENT DOCUMENTS

| | | | | |
|---|---|---|---|---|
| CA | 684062 A | * | 4/1967 | |
| CA | 684062 | | 4/1967 | .................. 261/35 |
| DE | 148630 | | 6/1981 | .................. 501/144 |
| DE | 213202 | | 9/1984 | .................. 501/144 |
| EP | 281420 | | 9/1988 | .................. 501/143 |
| JP | 40-7283 | | 4/1965 | |
| JP | 54-26565 | | 9/1979 | |
| JP | 56-109869 | | 9/1981 | .................. 501/144 |
| JP | 60-33247 | | 2/1984 | .................. 501/143 |
| JP | 59-131562 | | 7/1984 | .................. 501/144 |
| JP | 59-199568 | | 11/1984 | .................. 501/143 |
| SU | 421665 | | 8/1974 | |
| SU | 704927 | | 12/1979 | .................. 501/144 |
| SU | 796206 | | 1/1981 | |
| SU | 1018927 | | 5/1983 | |

OTHER PUBLICATIONS

*Chemical Resistance of Refractories to Al and Al–Mg Alloys*, by J.G. Lindsay, W.T. Bakker and E.W. Dewing; reprinted from the Journal of The American Ceramic Society, vol. 47, No. 2, dated Feb. 1964; pp. 90–94.

(List continued on next page.)

*Primary Examiner*—David Sample
(74) *Attorney, Agent, or Firm*—Mark Kusner; Michael A. Jaffe

(57) ABSTRACT

A method of making a cristobalite-free, mullite grain capable of withstanding reaction with molten aluminum, comprising the steps of: producing a clay slurry comprised of water and kaolin clay of a specific particle size; mixing a water insoluble barium or strontium containing compound into the clay slurry in an amount wherein the barium or strontium containing compound content of the slurry is equal to about 8% by weight of the kaolin clay in the slurry; removing sufficient water from the slurry to form a material having an pelletizable consistency; forming the material into pellets; heating the pellets by continuously moving them through a furnace having a zone, wherein the material is exposed to temperatures of at least 2,650° F. (1,455° C.) for at least 30 minutes.

2 Claims, 6 Drawing Sheets

(4 of 6 Drawing Sheet(s) Filed in Color)

U.S. PATENT DOCUMENTS

| | | |
|---|---|---|
| 4,126,474 A | 11/1978 | Talley et al. .................. 106/63 |
| 4,272,500 A | 6/1981 | Eggerding et al. .......... 423/327 |
| 4,396,720 A | 8/1983 | Beall et al. ..................... 501/5 |
| 4,522,926 A | 6/1985 | Felice ........................ 501/127 |
| 4,569,770 A | 2/1986 | Martins |
| 4,717,695 A | 1/1988 | Oda ........................... 501/143 |
| 4,762,811 A | 8/1988 | Vayda et al. ................ 501/125 |
| 4,783,431 A | 11/1988 | Hoshi et al. ................ 501/153 |
| 4,806,509 A | 2/1989 | Porterfield .................. 501/127 |
| 4,843,047 A | 6/1989 | Oda ........................... 501/143 |
| 4,868,142 A | 9/1989 | Waisala et al. ............... 501/85 |
| 5,036,030 A | 7/1991 | Taga et al. .................. 501/125 |
| 5,281,462 A | 1/1994 | Day et al. ................... 428/116 |
| 5,294,576 A | 3/1994 | Mizushima et al. ......... 501/128 |
| 5,455,209 A | 10/1995 | Powell ......................... 501/17 |
| 5,461,015 A | 10/1995 | Kinsman et al. ............ 501/141 |
| 5,556,817 A * | 9/1996 | Cortellini ................... 501/128 |
| 5,565,392 A | 10/1996 | Kinsman et al. ............ 501/141 |
| 5,639,704 A | 6/1997 | Inuzuka et al. ............. 501/127 |
| 5,641,440 A | 6/1997 | Talmy et al. ................ 264/681 |
| 5,641,720 A | 6/1997 | Fassbinder .................. 501/141 |
| 5,707,911 A | 1/1998 | Rakhimov et al. .......... 501/128 |
| 5,807,798 A | 9/1998 | Bolt et al. ..................... 501/94 |
| 5,846,891 A * | 12/1998 | Son et al. .................... 264/125 |
| 5,948,713 A | 9/1999 | Smiley et al. ................. 501/5 |

OTHER PUBLICATIONS

Chemical Abstract NO. 77:155760, abstract of an article by 1972 Hamano et al. entitled "Factors affecting the mechanical properties of porcelain bodies," Mech. Behav. Mater., Proc. Int. Conf. 1st, vol. 4, 475–83.

Chemical Abstract No. 89:79093, abstract of an article 1978 by Schroeder entitled "Inexpensive high strength electrical porcelain," Am. Ceram. Soc., Bull. 57(5), 526.

* cited by examiner

MOLTEN ALUMINUM (NON-FLUXED) CUP TEST
(RUN AT 927°C [1500°F] FOR 240 HOURS)

REFRACTORY MIX CONTAINING AGGREGATE FORMED FROM CLAY MIXTURE WITH 0% BY WEIGHT $BaSO_4$

REFRACTORY MIX CONTAINING AGGREGATE FORMED FROM CLAY MIXTURE WITH 8% BY WEIGHT $BaSO_4$

REFRACTORY MIX CONTAINING AGGREGATE FORMED FROM CLAY MIXTURE WITH 12% BY WEIGHT $BaSO_4$

MOLTEN ALUMINUM (FLUXED) CUP TEST
(RUN AT 927°C [1500°F] FOR 240 HOURS)

REFRACTORY MIX CONTAINING AGGREGATE FORMED FROM CLAY MIXTURE WITH 0% BY WEIGHT $BaSO_4$

REFRACTORY MIX CONTAINING AGGREGATE FORMED FROM CLAY MIXTURE WITH 8% BY WEIGHT $BaSO_4$

REFRACTORY MIX CONTAINING AGGREGATE FORMED FROM CLAY MIXTURE WITH 12% BY WEIGHT $BaSO_4$

CRISTOBALITE-FREE MULLITE GRAIN HAVING REDUCED REACTIVITY TO MOLTEN ALUMINUM AND METHOD OF PRODUCING THE SAME

This application is a divisional of co-pending U.S. patent application Ser. No. 09/429,205 filed on Oct. 28, 1999 now U.S. Pat. No. 6,407,023B.

FIELD OF THE INVENTION

The present invention relates generally to refractory compositions that are resistant to molten metal, and more particularly to a cristobalite-free, mullite grain that is non-reactive with molten aluminum.

BACKGROUND OF THE INVENTION

Conventional refractories used for the melting, alloying, containing and refining of molten aluminum and its alloys are susceptible to penetration, reaction and erosion by the molten aluminum. The aluminum, and alloying ingredients within the molten aluminum, penetrate the surface of conventional refractories and react with the refractory components. The result is the formation of compounds such as corundum ($Al_2O_3$) and spinel ($MgOAl_2O_3$) that expand and cause the refractory to crack. The cracking allows deeper penetration by the molten aluminum into the refractory causing further chemical reaction.

In addition, the foregoing compounds (i.e., the corundum and spinel) induce the formation of aluminum oxide on the surface of the refractory, as a result of the oxidation of the molten aluminum. This build-up of aluminum oxide interferes with the operation of the furnace and is therefore undesirable. Still further, the molten aluminum that penetrates the refractory can also reduce other oxides, such as silica ($SiO_2$) and iron oxide ($Fe_2O_3$), that are present in the refractory. This results in the formation of corundum and solvation of the Si and Fe in the molten aluminum that results in embrittlement of the solid aluminum alloy. Heretofore, refractories with minimal wetting characteristics were produced using conventional refractory grains (that are normally susceptible to wetting by molten aluminum) by adding non-wetting materials as fines in the matrix of the refractory. The purpose of these fines is to retard the penetration of the molten aluminum into the refractory. For example, the addition of spinel to high alumina refractories slows the aforementioned reactions by presenting "pre-reacted" material to the molten aluminum. The levels of silicon and iron in such compositions are minimized to avoid reduction and dissolution of these phases from the refractory to the molten metal. However, the cost of such refractory systems is high, and such refractory systems still do not prevent the external dross attachment known as "corundum growth."

It has also been known to add boric acid and phosphates to a refractory system to minimize the porosity thereof and to slow the aforementioned reactions. In most cases, these additives have been included in unfired products because the firing process volatilizes these materials or renders them ineffective.

The foregoing additives find advantageous use primarily with refractory systems having moderate to high alumina content. Refractory grains having higher alumina content are relatively expensive, but tend to react slowly to the aforementioned reduction and penetration by the molten aluminum. Nevertheless, these high alumina materials will react with, and eventually be penetrated by, the molten aluminum.

In refractory systems with lower alumina content, the silica typically, found in greater amounts in such refractory systems, is more readily reduced and dissolved in the molten aluminum. The remaining alumina of this system reacts with the alloying ingredients. Thus, in refractory systems known heretofore, the refractory grain (even high alumina grain) was susceptible to attack by molten aluminum, and efforts to reduce such attack consisted primarily of trying to minimize the porosity of the refractory system to reduce the exposure of the refractory grain to the molten aluminum.

The present invention overcomes these and other problems and provides a refractory grain that is less susceptible to wetting and attack by molten aluminum. Still further, the present invention provides a method of forming a cristobalite-free mullite grain suitable for other refractory applications.

SUMMARY OF THE INVENTION

In accordance with the present invention, there is provided a method of calcining kaolin, comprising the steps of:
  a) producing a clay slurry comprised of water and kaolin clay of a specific particle size;
  b) thoroughly mixing an alkaline earth metal compound selected from the group consisting of barium, strontium and a mixture thereof with said clay slurry, said compound being added in an amount wherein the barium or strontium compound content of said slurry is between about 2% by weight and about 25% by weight of the kaolin clay in the clay slurry;
  c) removing sufficient water from the slurry to form a dehydrated kaolin clay-based material having a consistency that can be shaped;
  d) shaping the dehydrated kaolin clay-based material; and,
  e) heating said dehydrated kaolin clay-based material by continuously moving the shapes through a furnace having a zone, wherein the shapes are exposed to a temperature of at least 2,650° F. (1,455° C.), for at least 30 minutes.

In accordance with another aspect of the present invention, there is provided an inorganic mixture for forming a refractory grain, comprised of beneficiated kaolin clay that is essentially free of sand and impurities. The kaolin clay provides a source of alumino-silicate to the inorganic mixture. A compound additive containing at least one element selected from the group consisting of barium and strontium is added to the clay, wherein the alumino-silicate in the kaolin clay comprises about 50% to about 98% by weight of the inorganic mixture, and the at least one element in the compound additive comprises about 2% to about 25% by weight on an oxide basis of the inorganic mixture.

In accordance with another aspect of the present invention, there is provided a method of making a cristobalite-free, mullite grain having diminished reaction with molten aluminum, comprising the steps of:
  a) producing a clay slurry comprised of water and kaolin clay of an average particle size;
  b) thoroughly mixing a water insoluble barium or strontium containing compound with the clay slurry, the barium- or strontium-containing compound having an average particle size about equal to the average particle size of the kaolin clay within the clay slurry and being added in an amount, wherein the barium or strontium content of the clay slurry is equal to between about 3% and about 20% by weight of the kaolin clay in the clay slurry;

c) removing sufficient water from the slurry to form a dehydrated kaolin clay-containing mixture having a pelletizable consistency;

d) pelletizing the dehydrated kaolin clay-containing mixture into pellets;

e) heating the pellets by continuously moving the pellets through a furnace having a zone, wherein the pellets are exposed to a temperature of at least 2,650° F. (1,455° C.), and wherein the pellets are exposed to the zone for at least 30 minutes.

In accordance with another aspect of the present invention, there is provided a method of producing a cristobalite-free, mullite grain, comprising the steps of:

a) preparing a kaolin clay slurry comprised of water and kaolin clay of a predetermined average particle size;

b) thoroughly mixing a barium- or strontium-containing compound with the kaolin clay slurry, the compound being selected from the group consisting of barium carbonate, barium chloride, barium chromate, barium hydroxide, barium sulfate, barium oxide, strontium carbonate, strontium oxide, strontium sulfate, strontium hydroxide and mixtures thereof;

c) heating the kaolin clay at a sufficient temperature for a sufficient period of time to:
  i) dehydrate the clay,
  ii) dehydroxylate the dehydrated clay to form metakaolin,
  iii) break down the metakaolin to form mullite and concomitantly form a liquid phase material comprised of silica; and, d) cooling the mullite and the liquid phase material.

In accordance with another aspect of the present invention, there is provided a method of producing a cristobalite-free bonded mullite grain from kaolin clay, comprising the steps of:

a) thoroughly blending kaolin clay, water and a barium- or strontium-containing compound in predetermined amounts to form a pelletizable mixture;

b) forming the mixture into pellets to a size and shape suitable for calcining in a kiln to prevent dusting;

c) calcining the mixture in a kiln under time and temperature conditions sufficient to cause the kaolin clay to form mullite and silica; and, d) further heating the mixture until the silica and the barium- or strontium-containing compound react to form a liquid phase material that wets the mullite.

In accordance with another aspect of the present invention, there is provided a refractory material comprised of mullite crystals in a cristobalite-free matrix, the mullite crystals identifiable by X-ray diffraction peaks at $2\theta=16.5°$, $26.5°$, $31°$, $33.3°$, $35.3°$ and $40.9°$, and the cristobalite-free matrix being comprised of the following material:

alumina ($Al_2O_3$);

silica ($SiO_2$); and at least 2% by weight of an oxide selected from the group consisting of barium oxide (BaO) and strontium oxide (SrO).

It is an object of the present invention to provide a refractory grain for the production of refractory articles.

It is another object of the present invention to provide a refractory grain as described above that is resistant to attack by molten aluminum.

It is another object of the present invention to provide a refractory grain as described above that is formed from an alumino-silicate source, such as kaolin clay.

It is a still further object of the present invention to provide a method for producing the refractory grain described above.

It is a still further object of the present invention to provide a method of producing a cristobalite-free mullite grain.

These and other objects and advantages will become apparent from the following description of a preferred embodiment of the present invention taken together with the accompanying drawings.

BRIEF DESCRIPTION OF THE DRAWINGS

This patent or application file contains at least one drawing executed in color. Copies of this patent with color drawing(s) will be provided by the Patent and Trademark Office upon request and payment of necessary fee.

A preferred embodiment of the invention will be described in detail in the specification and illustrated in the accompanying drawings which form a part hereof, and wherein.

DETAILED DESCRIPTION OF PREFERRED EMBODIMENT

Figure 1:
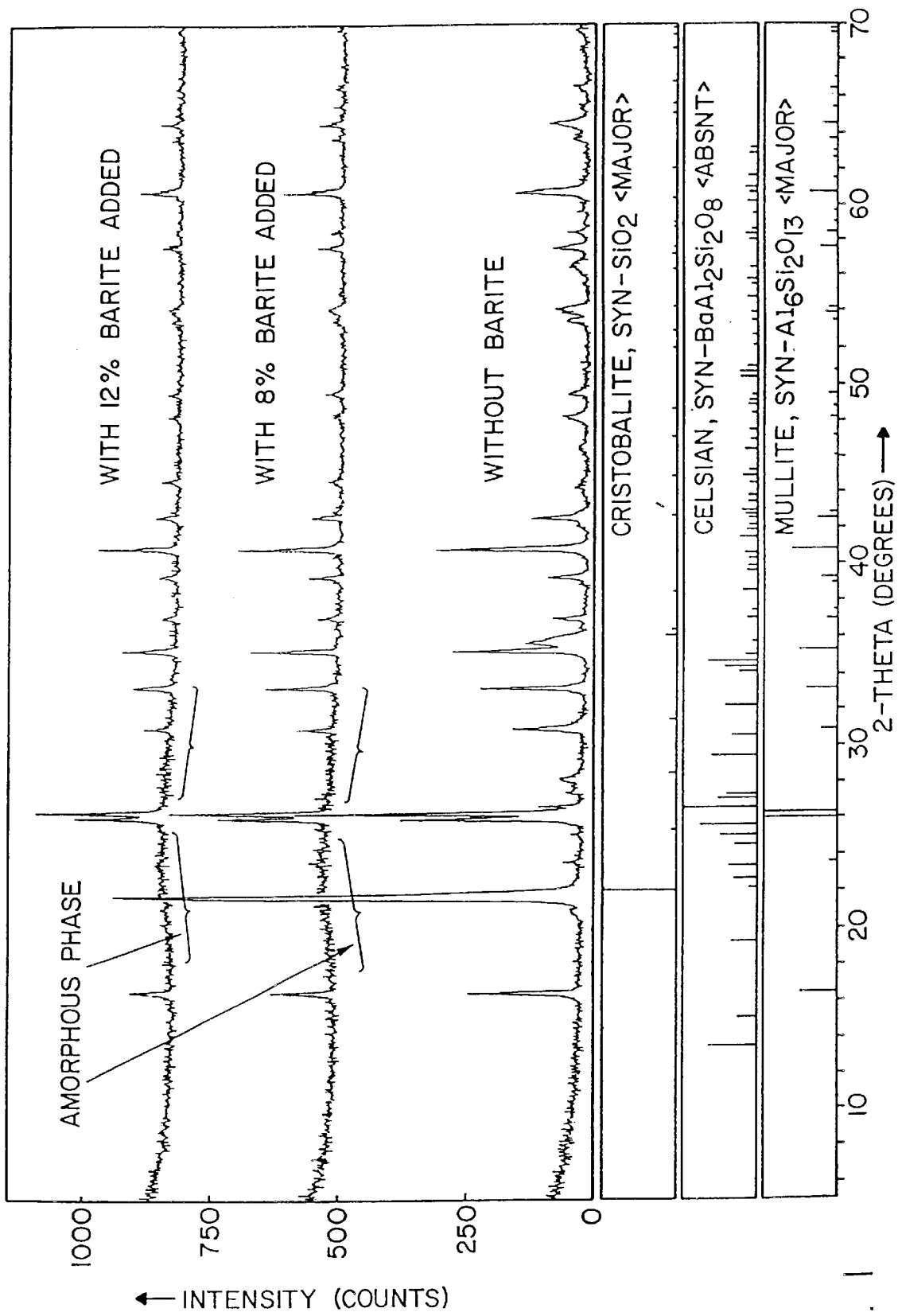
FIG. 1 is a chart showing X-ray diffraction patterns for refractory grains formed in accordance with the present invention.

The present invention relates generally to a refractory grain that is resistant to attack by molten metal. More specifically, the invention relates to a refractory grain formed from an alumino-silicate source that is resistant to attack by molten aluminum.

By way of background, mullite ($3Al_2O_3*2SiO_2$) is a material (typically provided in granular form) that is widely used in the manufacture of refractory products and components. Mullite is the only alumina-silica compound that remains stable at very high temperatures, neither melting nor showing any noticeable reaction until a temperature of about 3,270° F. (1,800° C.) is reached. As a result, mullite grain/grog is typically used as the basic component in refractory products for high temperature applications. Such high temperature applications include the melting, alloying, containing and refining of molten aluminum and its alloys.

Basically, every alumina-silica complex will form some mullite when fired to temperatures exceeding 2,192° F. (1,200° C.), but the actual amount formed not only depends on the firing temperature and the ratio of alumina to silica, but is also influenced enormously by the form in which both components are introduced, and by the kind and quantity of impurities present. For example, one refractory body containing 68% alumina ($Al_2O_3$) and 27% silica ($SiO_2$) may produce 89% mullite when fired, while another containing 71% alumina and 23% silica produces less than 35% mullite when fired.

It is known to form mullite by calcining kaolin clay. When pure kaolin clay is fired, it typically produces about 55% mullite. The mullite is in the form of crystals that are bonded by two forms of silica, i.e., cristobalite (which is one of the polymorphic crystalline forms of silica) and amorphous silica. The cristobalite forms about 15% of the resulting material of the fired or calcined kaolin, and the amorphous silica forms about 30% of the resulting material.

It is also known to produce cristobalite-free mullite from clay by adding a suitable amount of alumina thereto and heating the clay to very high temperatures (in the range of about 3,200° F. (1,760° C.)). In this process, the additional alumina reacts with available silica to form additional mullite. However, this process is cost-intensive due to the alumina additive and the energy required for firing at such high temperatures.

It is generally known that during rapid heating or cooling in the temperature range of 392° F. to 482° F. (200° C. to 250° C.), cristobalite undergoes a high/low inversion that is attended by a large change in volume. This crystallographic change of cristobalite makes mullite grain having cristobalite therein highly undesirable for high-temperature refractory materials and products, in that such a volume change may result in cracking of the refractory product.

Broadly stated, preparation of a refractory grain according to the present invention involves mixing an alumino-silicate source, such as kaolin clay, with a barium and/or strontium source to form an inorganic mixture. Alumina may be added to the mixture to adjust the alumina content to a desirable level. After the respective components are mixed, the mixture is fired to a temperature sufficient to convert the alumino-silicate source to mullite. The barium and/or strontium act/acts as a fluxing agent that retards the formation of cristobalite. The barium and/or strontium react/reacts with free silica and any silica liberated in the conversion of kaolin to mullite to form a stable glass that ties up the free silica, and thereby prevents the formation of cristobalite or other crystalline compounds.

It has been found that when a barium and/or strontium source is/are added to an alumino-silicate source at a level between about 2% by weight and about 5% by weight, a cristobalite-free, mullite grain is formed. In accordance with another aspect of the present invention, when a barium and/or strontium source compound is added at levels of about 5% by weight to about 25% by weight (based on an oxide basis), a cristobalite-free, mullite grain that is not easily wetted by molten aluminum is formed. The present invention thus provides refractory grains produced from an alumino-silicate source, such as kaolin clay, in combination with a barium and/or strontium source. The refractory grain is a cristobalite-free, mullite grain capable of resisting wetting by molten aluminum. Barium or strontium sources such as barite ($BaSO_4$), celestite ($SrSO_4$) or an oxide, carbonate or hydroxide form of these elements may be used in the composition as a source of the barium or strontium.

The preparation of a cristobalite-free mullite grain in accordance with the present invention involves two generally distinct stages. The first stage is generally a processing stage, wherein kaolin clay and a barium and/or strontium containing compound is prepared for heating. The processing stage basically is comprised of the following steps:. (1) a beneficiation step to remove undesirable impurities from kaolin clay and to establish a desirable particle size; (2) a step of blending the kaolin clay with the barium and/or strontium containing compound; (3) a step of processing of the kaolin clay into a pelletizable or extrudable form; and (4) a step of pelletizing or extruding the kaolin clay into a preferred size for heating.

Once placed into a desired shape and form, the kaolin clay undergoes the second stage, i.e., a heating stage that is basically comprised of: (1) a dehydration phase; (2) a dehydroxylization phase and metakaolin formation phase; (3) a reaction phase wherein the barium and/or strontium containing compound react/reacts with free silica and, if present, other impurities in the alumina-silicate source materials; and, (4) a recrystallization phase of the metakaolin to mullite. The foregoing stages, steps and phases shall now be described in greater detail with respect to a preferred process. It will, of course, be understood that changes and modifications will occur to those skilled in the art upon a reading and understanding of the specification.

Referring now to the processing stage, it is important to the present invention that the kaolin clay that is to be ultimately heated and converted to mullite be substantially free of impurities and undesirable materials. Accordingly, a beneficiation step to separate the kaolin clay from sand and other undesirable particles is conducted. In this respect, the kaolin clay is preferably separated from sand and other impurities by a washing process, wherein the kaolin clay and water form a watery slurry which is passed through hydroclones to obtain a slurry containing kaolin clay having a specific particle size distribution. Settling tanks may also be used in separating the clay from the sand and other impurities. In this respect, kaolin clay having an average particle size of about 20 microns is sufficiently small so as to be separable from sand. However, the 20-micron particle size in and of itself is not critical to the present invention. It is only important that the resultant kaolin clay slurry be substantially free from impurities and sand. It has been found that kaolin clay having a particle size of less than 20 microns may be separated from sand which is typically larger in size. Parenthetically, it is understood by those skilled in the art that the kaolin clay particles are typically not spherical. To determine an average particle size, one must determine an average diameter for each non-spherical particle, sum all of these diameters and divide the total by the number of particles. If one were to plot the frequency of occurrence of the average diameter of each particle as a function of the average diameter of each particle, one would find that the graph would be in the form of a distribution. Instrumentation is available that can determine the form of this distribution and that can determine the average particle size. Another method of looking at particle sizes involves using a mesh. When a mesh is used, the particles are sifted through a screen comprised of nearly equivalent openings. The particles that are sifted through the screen have average particle sizes less than the mesh size of the screen (as those particles will easily fall through the openings in the screen).

The clay slurry obtained from the aforementioned beneficiation step would typically be comprised substantially of water. This watery slurry is preferably "thickened" to a point where the kaolin clay forms about 30% by weight of the slurry. In other words, the slurry is comprised of 30% by weight of solids in the form of kaolin clay particles. As used herein, the term "thickened" refers to a slurry having some water removed therefrom. This may be accomplished by conventional settling tanks, wherein the solid particles are settled and the water separated therefrom.

At this point, a "source material" containing barium and/or strontium is added to the dehydrated slurry and mixed therewith. As used herein, the term "source material" shall mean a material or compound that provides a source of barium and/or strontium. In accordance with a preferred embodiment of the present invention, a source material comprised of barium sulfate ($BaSO_4$) is added and mixed with the slurry. As indicated above, other compounds containing barium, such as barium carbonate, may be used. Barium sulfate ($BaSO_4$) is preferred over barium carbonate ($BaCO_3$) because of cost. Barium oxide (BaO) is not preferred because it is hydrophilic in its pure form. Further, as indicated above, compounds containing strontium, such as celestite ($SrSO_4$), strontium carbonate (SrCO3) or strontium oxide may also be used.

In accordance with the present invention, the source material is preferably added to the clay slurry based upon the amount of clay solids in the slurry and the barium and/or strontium content of the source material. The source material is preferably added in an amount such that the barium and/or strontium content is/are equal to about 2% by weight to about 25% by weight, more preferably from about 5% by weight to about 15% by weight and most preferably, from about 5% to about 12% by weight of the clay solids in the clay slurry.

The source material providing the barium and/or strontium material preferably has a particle size dimensioned to match the particle size of the kaolin clay particles in the slurry so as to facilitate thorough mixing and interaction of the barium and/or strontium source material with the kaolin clay particles.

Hereinafter, the present invention shall be described, for the purpose of illustration, with respect to the use of barium sulfate as the source material. As indicated above, other barium- or strontium-containing compounds may be used without deviating from the present invention.

In the present embodiment, the physical specifications of the barium sulfate are as follows:

+200 mesh——0.5% max
+325 mesh——4.5% max
$D_{50}$ about 12 microns.

As indicated above, the barium sulfate ($BaSO_4$) is added to the clay slurry based upon the weight of kaolin clay solids in the slurry. In accordance with the present invention, the barium sulfate ($BaSO_4$) is added in an amount such that barium comprises at least about 5% by weight of the solids in the kaolin clay slurry. Stated another way, the addition of the source material should give the solids within the slurry (i.e., the kaolin clay), a barium content of at least about 5%. In this respect, it has been found that the addition of barium and/or strontium at levels below about 5% by weight result/ results in a refractory grain that is wetted by and capable of reacting with molten aluminum.

Additional alumina may be added to the clay slurry to react with excess silica in the clay. The alumina is added in amounts between 0% to about 35% by weight.

The resultant slurry containing the kaolin clay and the barium sulfate is then thickened from about 30% by weight solids, to a pelletizable or extrudable form, to about 78% by weight solids. The thickening of the slurry may be accomplished by conventional means such as vacuum filters and/or drying ovens. A small amount of a binder (such as aluminum sulfate) may be added to the kaolin clay mixture to provide "green strength" to the kaolin clay mixture so as to prevent the kaolin clay mixture from completely breaking down into a powder during the heating step that shall hereinafter be described. The kaolin clay mixture is then preferably pelletized by conventional means.

The processing as heretofore described refers to specific steps for the preparation of the kaolin clay into a pre-fired mixture. Further, zircon or zirconia may be added to enhance the thermal shock resistance of the ultimate, refractory grain. Still further, as indicated above, if the resultant clay pellets do not have the desired chemistry, alumina may be added thereto (or added at any processing step) to adjust the chemistry of the pre-fired mixture to obtain the desired physical properties in the resultant refractory grain.

The processing stage discussed heretofore discloses adding a source material containing barium and/or strontium to a kaolin clay slurry prior to a filtering to remove excess water. It will be appreciated by those skilled in the art that the source material containing the barium and/or strontium could be added to the clay after the clay has been filtered, i.e., where the clay is in a paste form at the lower moisture level. In other words, the specific "processing" steps in and of themselves are not critical so long as the resultant mixture (i.e., kaolin clay), contains the barium and/or strontium containing compounds in proper proportion and particle size to facilitate the dissolution and reaction thereof as shall hereinafter be described. In this respect, it should also be appreciated that the resultant pre-fired mixture could be obtained by means other than through the addition of barium and/or strontium to beneficiated kaolin clay. A mixture of pure alumina and pure silica together with a source of barium and/or strontium and a vehicle to bind the mixture would provide the desired "pre-fired" mixture. In other words, any method in the art that would ultimately mix a barium- and/or strontium-containing compound with an alumino-silicate compound at the desired levels would suffice for the purpose of producing the desired refractory material.

In accordance with the present invention, the pre-fired mixture is generally comprised of:

a first component comprising an alumino-silicate source, wherein said alumino-silicate source comprises about 50% by weight to about 95% by weight of said mixture;

a second component comprising 0 to about 35% by weight alumina;

a third component containing an element selected from the group consisting of barium, strontium and combinations thereof, wherein said element comprises about 2% by weight to about 25% by weight of said mixture; and a vehicle to bind said components into a shape.

More preferably, the alumino-silicate source of the first component comprises about 65% by weight to about 78% by weight of the mixture, the alumina of the second component comprises about 5% by weight to about 15% by weight of the mixture and the element of the third component comprises about 5% by weight to about 15% by weight of the mixture.

Referring now to the heating stage of the process of the present invention, i.e., the transformation of the mixture to a refractory grain, the mixture undergoes several physical changes during firing, namely: (1) a dehydration phase; (2) a dehydroxylization phase; (3) a metakaolination phase; (4) a reaction between the barium- and/or strontium-containing compound and free silica and, if present, other impurities in the alumino-silicate source; and, (5) a recrystallization of the metakaolin into mullite. Each of these changes takes place at different temperatures. According to a preferred process, the mixture (i.e., the kaolin clay with the barium- and/or strontium-containing compound) as pellets, is introduced into a conventional rotary kiln capable of attaining a temperature of at least 2,750° F. (1,510° C.). The data and information set forth within the present specification are based upon forming mullite grain from kaolin in such a conventional rotary kiln.

The heating shall now be further described with respect to a mixture comprised of beneficiated kaolin clay and a barium sulfate. Again, it will be appreciated that a similar process and reaction would occur if other sources of barium or strontium or a combination of barium and strontium were used. Within the kiln, a temperature gradient is developed from the entry end of the kiln to the exit end of the kiln. Specifically, at or near the kiln entrance, a temperature of approximately 800° F. (426° C.) is established. From this temperature, the kiln increases in temperature to approximately 2,750° F. (1,510° C.) near the exit end of the kiln. The temperature gradient established within the kiln is basically a natural result of the phase changes and chemical reactions of the kaolin clay mixture as it proceeds through the kiln. Stated another way, the temperature gradient established within the kiln is produced as a natural consequence of the endothermic or exothermic interplay of heat with the kaolin clay.

Specifically, at the entrance of the kiln, the dehydration phase of the heating process occurs as the hydrated kaolin clay mixture absorbs heat to drive off moisture. This dehydration of the clay mixture maintains the temperature near the entry end of the kiln at approximately 800° F. to 900° F. (426° C. to 482° C.). With respect to the dehydroxylization phase of the kaolin clay mixture, hydroxyl ions and hydrogen ions are driven off such that only a small percentage of only the strongest bonded hydroxyls remain within the kaolin structure. This process likewise requires energy. During the dehydroxylization phase, the crystalline kaolin is converted to amorphous metakaolin. This conversion occurs at temperatures between about 1,000° F. (538° C.) to about 1,400° F. (760° C.). At slightly higher temperatures, the now decomposed metakaolin typically recrystallizes to form mullite. This recrystallization occurs at a temperature of about 1,800° F. (982° C.). Normally, in the absence of barium, cristobalite and amorphous silica are also formed at about 1,800° F. (982° C.). However, in the presence of barium, it is believed that in addition to the recrystallization of the decomposed metakaolin into mullite, separate solid state reactions occur. It is believed that during the recrystallization of metakaolin into mullite, which is a highly reactive event, free silica released during the recrystallization forms a liquid phase with the barium. It is further believed that the free silica formed during the calcination of kaolin is tied up in the glass phase resulting in a cristobalite-free product. It is also believed that the excess barium becomes an impervious glass structure, and that this glass structure enhances the resistance of a grain formed thereby to wetting and reaction with molten aluminum.

As the temperature of the material increases, more mullite is formed and more amorphous silica is formed as a by-product of the recrystallization of the metakaolin. As mullite is formed, the amorphous silica is dissolved into the liquid phase. A further rise in temperature to a soak temperature of about 2,700° F. (1,483° C.) completes mullitization and mullite crystal growth. At this temperature, complete wetting of the mullite by the amorphous phase occurs. Importantly, the cristobalite silica is drawn into the liquid phase at quite a low temperature (approximately 2,480° F. (1,360° C.)). Generally, barium sulfate loses oxides of sulfur, i.e., sulfur dioxide ($SO_2$) and sulfur trioxide ($SO_3$) at about 2,876° F. (1,580° C.) and the barium oxide (BaO) melts at about 3,493° F. (1,923° C.). However, the barium compound, when in contact with silica, forms a liquid eutectic at approximately 2,480° F. (1,360° C.) through a liquid state reaction. Thus, the dissolution of the cristobalite into the liquid phase occurs at a lower temperature than would occur naturally. This lower melting and reaction temperature is believed to be the result of the purity of the material and the thorough mixing and matching of the barium containing compound and kaolin particle sizes. In other words, the barium is in contact with silica to facilitate the formation of the eutectic liquid at 2,480° F. (1,360° C.). The material is preferably allowed to soak at a higher temperature of about 2,700° F. (1,483° C.) to complete the mullitization and mullite crystal growth, during which complete wetting of the mullite by the liquid material is accomplished. Upon cooling, the liquid material forms an amorphous, impervious glass structure that resists wetting and reaction with molten aluminum.

The dehydroxylization of the crystalline kaolin to form amorphous metakaolin is set forth as follows:

(1)

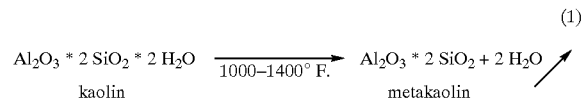

$$Al_2O_3 * 2\,SiO_2 * 2\,H_2O \xrightarrow{1000-1400° F.} Al_2O_3 * 2\,SiO_2 + 2\,H_2O$$
$$\text{kaolin} \qquad\qquad\qquad\qquad \text{metakaolin}$$

This reaction occurs at temperatures between 1,000° F. and 1,400° F. (538° C. to 760° C.). Increased heating of the material causes recrystallization of the amorphous metakaolin to form mullite and cristobalite. Amorphous silica is also formed as a by-product of the recrystallization of the amorphous metakaolin. This reaction is set forth as follows:

(2)

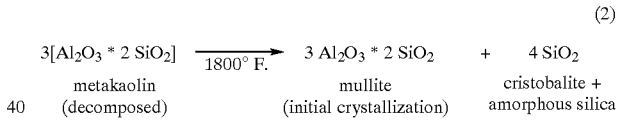

$$3[Al_2O_3 * 2\,SiO_2] \xrightarrow{1800° F.} 3\,Al_2O_3 * 2\,SiO_2 + 4\,SiO_2$$
$$\text{metakaolin} \qquad\qquad \text{mullite} \qquad\qquad \text{cristobalite +}$$
$$\text{(decomposed)} \qquad\qquad \text{(initial crystallization)} \qquad \text{amorphous silica}$$

Simultaneous to the recrystallization of the amorphous metakaolin into mullite and cristobalite, and the formation of amorphous silica, solid state reactions between the barium and/or strontium containing compound and the cristobalite and the barium and/or strontium containing compound and the amorphous silica occur.

The reaction for barium sulfate is set forth as follows:

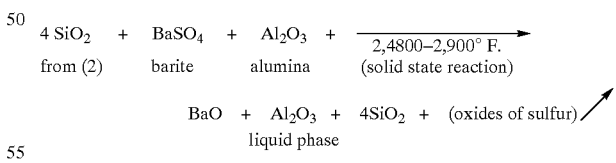

$$4\,SiO_2 + BaSO_4 + Al_2O_3 + \xrightarrow{2,4800-2,900° F.}$$
$$\text{from (2)} \quad \text{barite} \quad \text{alumina} \quad \text{(solid state reaction)}$$

$$BaO + Al_2O_3 + 4SiO_2 + \text{(oxides of sulfur)}$$
$$\text{liquid phase}$$

This reaction occurs at temperatures between 2,480° F. and 2,900° F. (1,360° C. and 1,595° C.). As shown in the reaction equation, the barite ($BaSO_4$) undergoes a chemical reaction resulting in the formation of barium oxide (BaO) and fugitive oxides of sulfur (i.e., sulfur dioxide ($SO_2$) and sulfur tri-oxide ($SO_3$)). These sulfur oxides are burned off during the firing process leaving barium oxide. As indicated above, the barium oxide (BaO) has a melting temperature of about 3,493° F. (1,923° C.), but because of the presence of silica as cristobalite and amorphous silica, a eutectic liquid is formed at 2,480° F. (1,360° C.) through a liquid state reaction with the silica. Further soaking of the material at temperatures of about 2,600° F. to 2,700° F. (about 1,428° C. to 1,483° C.) completes the conversion of the cristobalite to mullite and also completes the liquid state reaction of the amorphous silica and the barium compound producing a liquid phase that wets the mullite crystals at the soak temperature of 2,700° F. (1,483° C.). The composition of the liquid phase is characterized as amorphous, as evidenced by its lack of an identifiable X-ray diffraction signature. During the high temperature soak at 2,700° F. (1,483° C.), the mullite crystals increase in size and the wetting of the mullite by the liquid phase is completed.

The composition of liquid phase includes barium oxide (BaO), alumina ($Al_2O_3$), silica ($SiO_2$), together with small amounts (typically less than 2%) of titanium oxide ($TiO_2$), ferric oxide ($Fe_2O_3$). The exact quantities of these materials is dependent on the composition of kaolin, the barium composition used, and the amount of alumina added to clay slurry or present in the kaolin clay itself.

Generally, it has been found that the conversion of the kaolin clay to mullite and the liquid phase can occur within approximately 2½ to 3 hours total time. Specifically, for pellets of approximately ¼ to ¾" in diameter, a kiln having an entrance temperature of about 800° F. to 900° F. (426° C. to 482° C.), a firing zone temperature near the middle of the kiln of about 2,750° F. (1,510° C.) and a rotary speed of 40 rph, approximately 2 to 3 hours was required to complete the mullitization and mullite crystal growth of the clay. Once discharged from the kiln, the pellets are preferably cooled to a handling temperature in about 45 minutes. Thereafter, crushing and separation of the cooled pellets to a desired size range may be undertaken.

By heating kaolin clay and barium sulfate ($BaSO_4$) under the foregoing conditions, a cristobalite-free mullite grain is produced. The absence of cristobalite may be established by conventional X-ray diffraction techniques.

FIG. 1 shows several X-ray patterns for grains formed in accordance with the foregoing process from clay slurries containing different levels of barium sulfate. Also shown in FIG. 1 are standard X-ray signature patterns for cristobalite, celsian ($BaAl_2SiO_8$) and mullite. Noticeably, the major peak for cristobalite at $2\theta=22°$ is absent from the X-ray diffraction patterns of the samples containing barium, as are the lesser peaks for cristobalite at $2\theta=28°$, 31.5° and 36. The characteristic peaks for mullite exist at $2\theta=16.5$, 26.5°, 31°, 33.3°, 35.3° and 40.9°. The absence of celsian ($BaAl_2SiO_8$) is also evident, indicating that barium is in the amorphous phase. The X-ray diffraction patterns show that clay slurries having a barite content of 8% and up will form cristobalite-free mullite.

Figure 2:
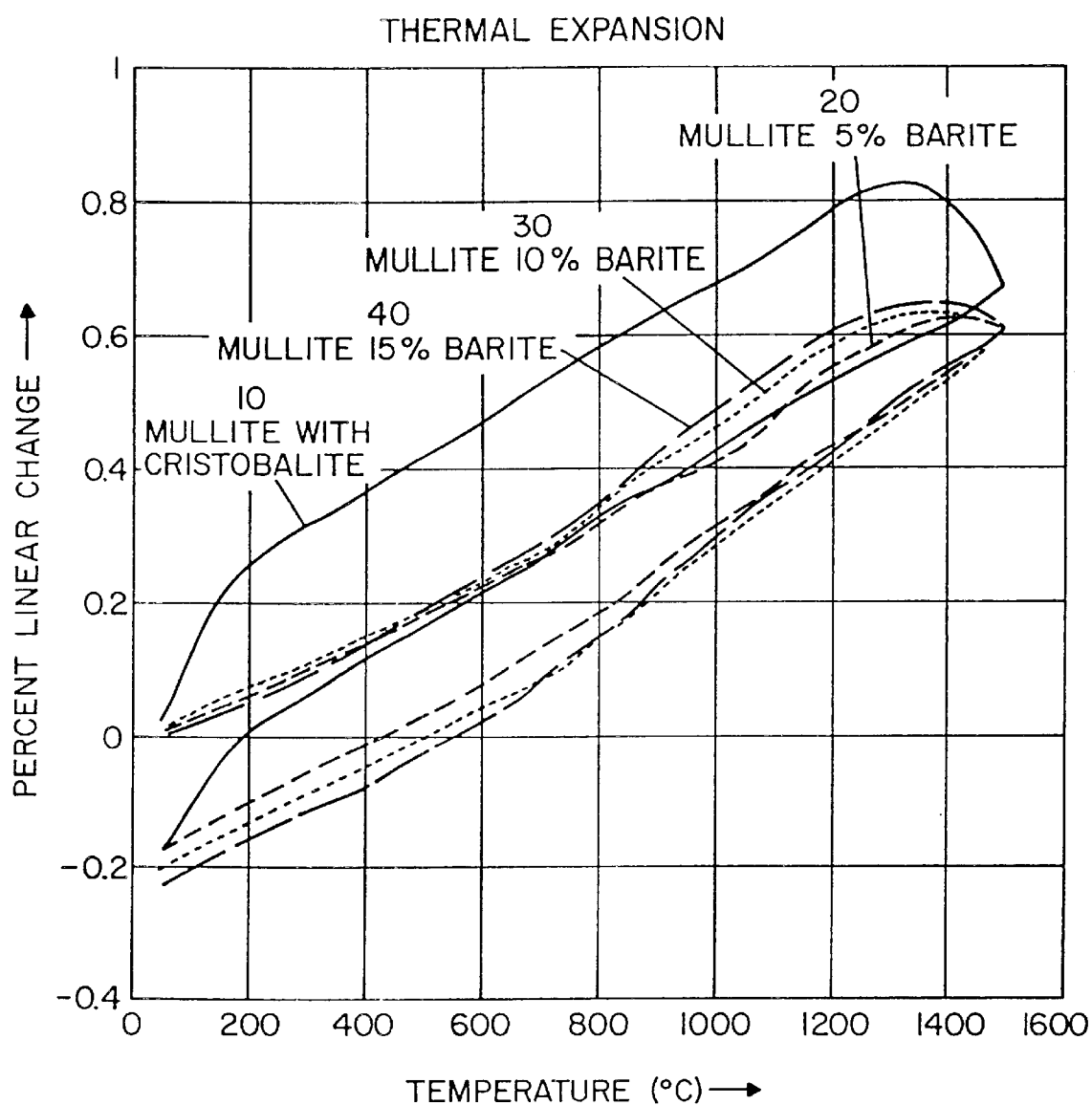
FIG. 2 is a graph showing thermal expansion curves for refractory grains formed in accordance with the present invention.

The absence of cristobalite is further established by a thermal expansion graph. FIG. 2 is a thermal expansion graph that shows a "linear change vs. temperature" curve for mullite with cristobalite and for cristobalite-free mullite formed from clay slurries having varied levels (i.e., 5%, 10% and 15%) of added barite. Curve 10, in accordance with the present invention, shows the heating and cooling profile for mullite with cristobalite. A noticeable change in the slope of the line can be seen at about 200° C., indicating the high/low inversion that cristobalite undergoes at about this temperature. Curve 20, 30, and 40 show respectively, the heating of mullite formed from clay slurries having 5%, 10% and 15% barite. No noticeable changes in the slope of lines 20, 30 and 40 are seen at 150° C., indicating an absence of cristobalite.

In the context of the present invention, it is believed that the reactive amorphous silica, which is generated as the kaolin clay is transformed to amorphous metakaolin in the first stages of the kiln, reacts with the barium (and/or strontium containing) compound additive in a solid state reaction at about 2,480° F. (1,360° C.) to form a eutectic liquid. As the mixture moves progressively to higher temperature zones of the kiln, mullite crystals form and are wetted by the liquid phase. More amorphous silica is taken into the liquid phase during the soak at an elevated temperature of 2,700° F. (1,483° C.).

The present invention shall be further described together with the following Examples that show the effect of barium sulfate when added to kaolin clay in forming a refractory grain, and further show the effect of such grain when used in a conventional refractory mix. In the Examples, proportions are set forth in weight percent unless otherwise indicated.

EXAMPLE I

Five (5) crucibles are prepared from mixtures of kaolin clay, alumina and barium sulfate. The formulation for each crucible is set forth in Table I. In the five (5) crucible mixtures, the weight percentage of barium sulfate is varied to determine the effect of such material has on the formation of mullite from kaolin clay. A crucible is also formed from a "control mix" that does not contain any barium sulfate. To avoid the problem of excess silica that is typically found associated with kaolin clay, calcined alumina is added to each crucible mix. The respective clay mixtures are prepared as slurries and cast into crucibles in plaster molds. The crucibles are fired to about 2,700° F. (1,483° C.) to basically form a cupped shaped aggregate piece for testing. The properties of respective crucibles are also shown in Table I.

TABLE I

| | Crucible Grains | | | | |
|---|---|---|---|---|---|
| RAW MATERIALS | Control | Crucible Mix 1 | Crucible Mix 2 | Crucible Mix 3 | Crucible Mix 4 |
| Kaolin | 76 | 73 | 70 | 67 | 75 |
| Calcined Alumina 325m | 24 | 23 | 22 | 21 | 23 |
| Barite ($BaSO_4$) | — | 4 | 8 | 12 | 2 |
| % Water | 25 | 25 | 25 | 25 | 25 |
| PROPERTIES | | | | | |
| Grain Bulk Density (g/cc) | 2.71 | 2.67 | 2.60 | 2.57 | 2.69 |
| Porosity (%) | 0.6 | 1.3 | 1.6 | 1.8 | 1.0 |
| PCE | 37–38 | 37–38 | 37–38 | 37–38 | 37–38 |

Figure 3:
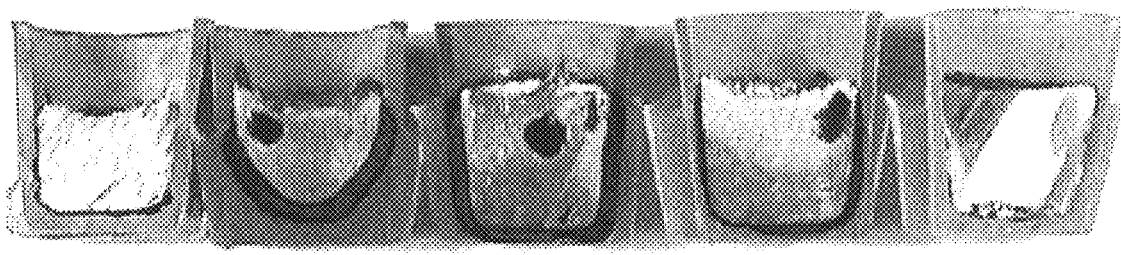
FIG. 3 is a photograph contrasting the interaction between aluminum and several crucibles that are formed from a mixture of kaolin clay, alumina and different levels of barium sulfate.

Each crucible is filled with aluminum and heated to about 1,500° F. (815° C.) for 240 hours. The crucibles are then cooled and sectioned. FIG. 3 is a photograph showing the effect of the aluminum on the respective crucibles. As shown in FIG. 3, a significant reduction in the reaction between the aluminum and crucibles is evident when the barium sulfate ($BaSO_4$) levels of the original slurry reach about 8% by weight.

Figure 4:
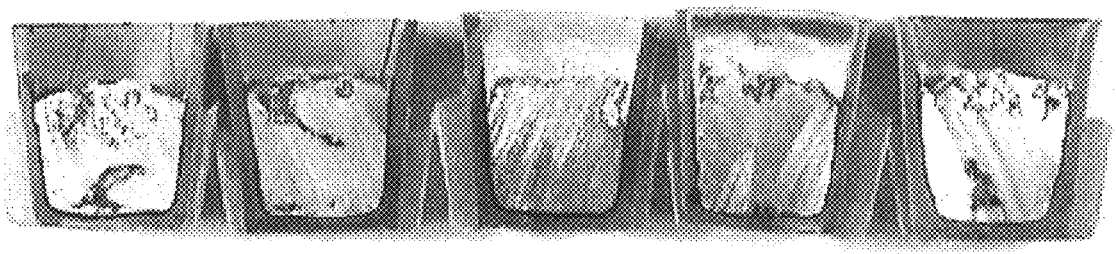
FIG. 4 is a photograph contrasting the interaction between aluminum with salt flux addition and several crucibles that are formed from a mixture of kaolin clay, alumina and different levels of barium sulfate.

A similar test is performed using aluminum with salt flux. The results are shown in FIG. 4, which is a photograph of the sectioned crucibles. As seen in FIGS. 3 and 4, as the barium sulfate content of the original slurries increases, the reaction of the aluminum with the crucibles decreases. A significant reduction in the reaction between the aluminum and the crucibles is noticeable for the crucible formed from a slurry having an 8% barium sulfate content, and non-observable reactivity occurred for the crucible formed from a slurry having a 12% barium sulfate content.

EXAMPLE II

To assure that the results of the foregoing EXAMPLE I are not related to the crucibles rather than the resultant grain material, aggregate grains are prepared from clay mixtures containing about 8% barium sulfate and 12% barium sulfate. Refractory castable mixes are then prepared using the respective aggregate grains. Table II shows a control mix formed of a conventional 60% alumina mullite grain and two refractory mixes, i.e., Mixes 1 and 2, formed in accordance with the present invention. Refractory Mix 1 contains aggregate grains formed according to the present invention from a clay mixture containing 8% barite. Refractory Mix 2 contains aggregate grains formed according to the present invention from a clay mixture containing 12% barite. The refractory mixes are formed into crucibles using a binding phase. The properties of the refractory mixes are shown in Table II.

TABLE II

| | Refractory Mixes | | |
|---|---|---|---|
| RAW MATERIALS | Control | Refractory Mix 1 | Refractory Mix 2 |
| IONE 60 Grain −3+4M | 10 | | |
| IONE 60 Grain −4+8M | 20 | | |
| IONE 60 Grain −8+20M | 20 | | |
| IONE 60 Grain −20M | 15 | | |
| GRAIN 2 −3/8M (from 8% Barite slurry) | | 30 | |
| GRAIN 2 −8/20M (from 8% Barite slurry) | | 20 | |
| GRAIN 2 −20M (from 8% Barite slurry) | | 15 | |
| GRAIN 3 −3/8M (from 12% Barite slurry) | | | 30 |
| GRAIN 3 −8/20M (from 12% Barite slurry) | | | 20 |
| GRAIN 3 −20M (from 12% Barite slurry) | | | 15 |
| Tabular Alumina −325M | 10 | 10 | 10 |
| Calcined Alumina −325M | 7.5 | 7.5 | 7.5 |
| Microsilica | 5 | 5 | 5 |
| SECAR 71 CA Cement | 5 | 5 | 5 |
| Amorphous AL2O3 AA101 | 1.25 | 1.25 | 1.25 |
| Barite −200M | 6.25 | 6.25 | 6.25 |
| TOTAL: | 100 | 100 | 100 |
| FIBER T-153 HERCULON | 0.08 | 0.08 | 0.08 |
| SURFACTANT | 0.15 | 0.15 | 0.15 |
| CITRIC ACID | 0.15 | 0.15 | 0.15 |
| Water addition: 4.7–5.5% | 4.99 | 5.32 | 5.43 |
| Flow: 30–38 | 32 | 30 | 28 |
| PROPERTIES | | | |
| Density, g/cc | | | |
| After 230° F. | 2.64 | 2.58 | 2.53 |
| After 1,500° F. | 2.61 | 2.55 | 2.48 |
| Porosity, % | | | |
| @230° F. | 10.3 | 10.9 | 10.5 |
| @1,500° F. | 15 | 14.3 | 16.2 |
| MOR, psi | | | |
| After 230° F. | 1700 | 1560 | 1460 |
| After 1,500° F. | 2600 | 2400 | 2060 |
| HMOR, psi | | | |
| @1,500° F. | 4910 | 3900 | 3680 |
| @2,000° F. | 1530 | 1410 | 1250 |
| Silicon pick-up in the 72 hr. cup test | 0.21 | 0.04 | 0.02 |

Figure 5:
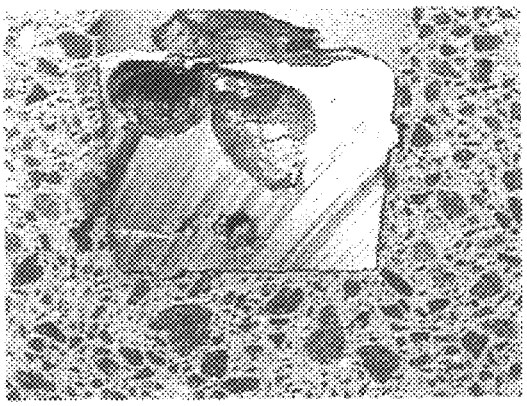
FIG. 5 is a photograph showing several crucibles formed from refractory mixes containing different aggregate grains according to the present invention, contrasting the interaction between aluminum and such crucibles.
Figure 5:
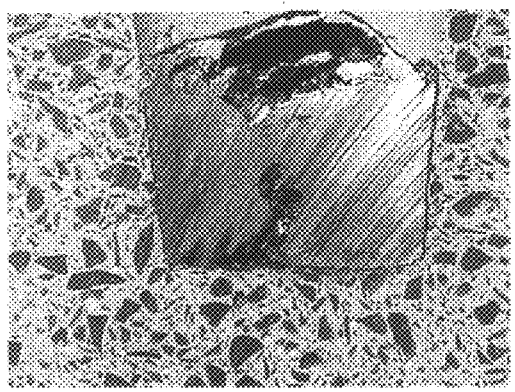
Figure 5:
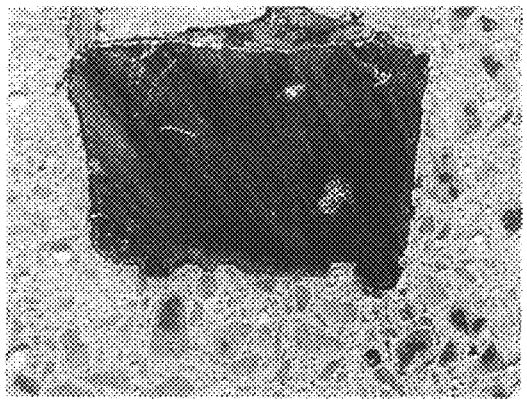
Figure 6:
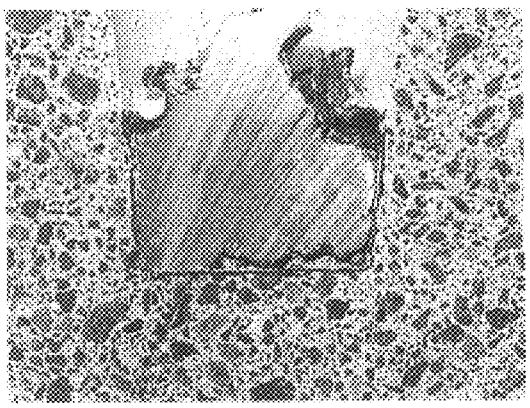
FIG. 6 is a photograph showing several crucibles formed from refractory mixes containing different aggregate grains according to the present invention, contrasting the interaction between aluminum with salt flux addition and such crucibles.
Figure 6:
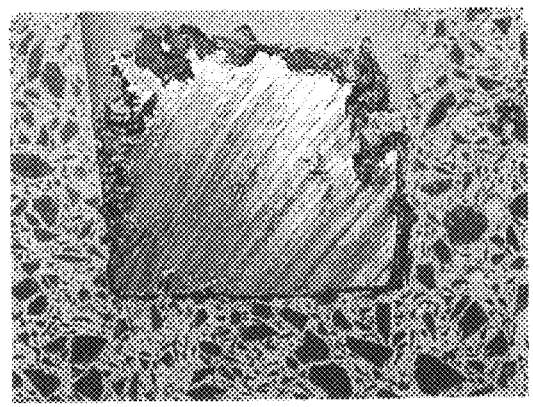
Figure 6:
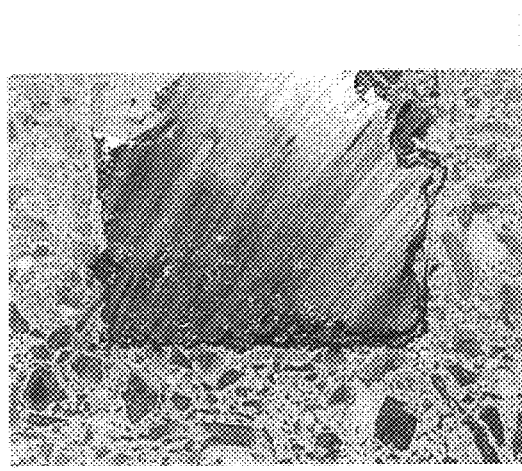

The crucibles formed from the respective refractory mixes are filled with aluminum and heated to about 1,500° F. (815° C.) for about 240 hours. The crucibles are then cooled and sectioned. FIG. 5 is a photograph showing cross-sections of the crucibles containing the three refractory mixes. A similar test is performed using aluminum with salt flux. The results of the aluminum with salt flux addition test are shown in FIG. 6. As shown in FIGS. 5 and 6, the reaction between the aluminum and the refractory grain decreases as the barium content of the grain increases. No grain reaction with the aluminum is observed for the refractory mix containing the aggregate grain formed from the clay mixture having the 12% added barium.

The foregoing Examples show that the addition of barium in the formation of mullite produces an aggregate grain having a reduced affinity for molten aluminum.

In the embodiment shown, barium sulfate ($BaSO_4$) is used to provide a source of barium. As indicated above, it is believed that other sources of barium, such as barium carbonate, barium chloride, barium chromate, barium hydroxide and barium oxide, may also find advantageous application in producing a cristobalite-free mullite grain having reduced affinity for aluminum. Further, it is believed that the addition of a strontium source, such as strontium carbonate, strontium oxide, strontium sulfate or strontium hydroxide, to the kaolin clay would also produce a cristobalite-free mullite grain having reduced affinity for aluminum. Mixtures of barium and strontium may also be used.

It is believed that barium reacts with the free silica to form an impervious glass structure that resists wetting and reaction with molten aluminum. The free energy of reaction of oxides with molten aluminum suggests that FeO, ZnO, $Cr_2O_3$, $Na_2O$, $SiO_2$ and $TiO_2$ are all reduced by molten aluminum. Barium oxide (BaO) is neutral and unreactive to molten aluminum. Strontium oxide (SrO) forms a solid solution with BaO and therefore, can be used interchangeably with a barium-containing compound or in any mixed ratio. It has also been discovered that the grain produced from this method also tends to be less contaminating due to the absorption of iron-bearing and/or titanium-bearing impurities into the glass phase.

Not meant to be bound hereby, it is believed that reduction of silica in the grain by molten aluminum or magnesium is avoided by the formation of a stable glass matrix around the mullite in the grain. That is, the free silica usually formed during calcination of kaolin is tied up in the glass to result in a cristobalite-free product. Unlike the magnesium-bearing or calcium-bearing grains that crystallize as magnesium or calcium alumino-silicates, it is believed that the barium and strontium additions form an impervious glass structure that resists wetting and reaction with molten aluminum.

The non-wetting grain disclosed herein can be mixed into a compatible matrix containing non-wetting additives and then applied to a substrate to produce a refractory composition that provides a maximum resistance to reaction with molten aluminum. The grain disclosed herein also tends to be a less contaminating component of refractories due, it is believed, to the absorption of iron-bearing and/or titanium-bearing impurities present in the glass phase.

It will be obvious to one skilled in the art that other raw materials may be added to the kaolin clay/barium and/or strontium containing compound mixture to adjust the chemistry of the final grain. For example, as indicated above, an alumina source may be added to increase the content of $Al_2O_3$. In addition, zircon or zirconia may be added to improve the thermal shock resistance of the final product.

The present invention has been described with respect to a preferred embodiment. Modifications and alterations may occur to others upon the reading and understanding of the specification.

Having described the invention, the following is claimed:

1. A refractory material comprised of mullite crystals in a cristobalite-free matrix, said mullite crystals identifiable by X-ray diffraction peaks at 2θ=16.5°, 26.5°, 31°, 33.3°, 35.3° and 40.9°, and said cristobalite-free matrix being comprised of the following material:

alumina ($Al_2O_3$);

silica ($SiO_2$); and at least 2% by weight of an oxide selected from the group consisting of barium oxide (BaO) and strontium oxide (SrO). A refractory material as described in claim 1 wherein said cristobalite-free matric contains 2% to about 20% by weight of an oxide selected from the group consisting of barium oxide (BaO) and strontium oxide (SrO).

2. A refractory material as described in claim 1, wherein said cristobalite-free matric contains 2% to about 20% by weight of an oxide selected from the group consisting of barium oxide (BaO) and strontium oxide (SrO).

* * * * *

UNITED STATES PATENT AND TRADEMARK OFFICE
CERTIFICATE OF CORRECTION

PATENT NO.     : 6,548,436 B2
DATED          : April 15, 2003
INVENTOR(S)    : H. David Prior, Jr. et al.

It is certified that error appears in the above-identified patent and that said Letters Patent is hereby corrected as shown below:

<u>Column 16,</u>
Lines 1-5, "A refractory material as described in claim 1 wherein said cristobalite-free matric contains 2% to about 20% by weight of an oxide selected from the group consisting of barium oxide (BaO) and strontium oxide (SrO)" is deleted.

Signed and Sealed this

Twelfth Day of August, 2003

JAMES E. ROGAN
*Director of the United States Patent and Trademark Office*